US007488885B2

(12) United States Patent
Watanabe

(10) Patent No.: US 7,488,885 B2
(45) Date of Patent: Feb. 10, 2009

(54) KEY GUIDE STRUCTURE IN KEYBOARD APPARATUS

(75) Inventor: Keisuke Watanabe, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 38 days.

(21) Appl. No.: 11/726,842

(22) Filed: Mar. 23, 2007

(65) Prior Publication Data

US 2007/0221042 A1 Sep. 27, 2007

(51) Int. Cl.
*G01D 13/02* (2006.01)

(52) U.S. Cl. .................................................... 84/423 R

(58) Field of Classification Search ................... 84/453, 84/423 R, 433–436, 174, 184, 185, 186.1, 84/190, 243

See application file for complete search history.

(56) References Cited

U.S. PATENT DOCUMENTS 4,375,179 A * 3/1983 Schwartz et al. .............. 84/439
5,495,074 A * 2/1996 Kondo et al. .................. 84/690
5,824,928 A 10/1998 Kumano et al.

FOREIGN PATENT DOCUMENTS

| | | |
|---|---|---|
| JP | 52-154230 | 11/1977 |
| JP | 3-105894 | 11/1991 |
| JP | 4-289895 | 10/1992 |
| JP | 9-244656 | 9/1997 |

* cited by examiner

*Primary Examiner*—Kimberly R Lockett
(74) *Attorney, Agent, or Firm*—Morrison & Foerster LLP

(57) ABSTRACT

Keyboard apparatus has a frame and a key pivotably mounted on the frame. Key guide structure includes a key-side guide member provided inside the key, and a frame-side guide member provided on the frame. The key-side guide member has at least one convexly-formed portion projecting from the inner surface of a distal end portion of the key, remote from a pivot point of the key, toward the pivot point. The frame-side guide member permits movement of the key-side guide member along a pivoting direction of the key, but limits lateral movement of the key-side guide member.

10 Claims, 6 Drawing Sheets

A—A

KEY GUIDE STRUCTURE IN KEYBOARD APPARATUS

BACKGROUND OF THE INVENTION

The present invention relates to a key guide structure for use in a keyboard apparatus, having keys pivotably mounted on a key frame, which guides pivoting movement of a key by means of a key-side guide member provided on an inner wall surface of the key and a frame-side guide member provided integrally with the key frame.

Key guide structures of the aforementioned type are disclosed, for example, in Japanese Patent Laid-open Publication No. HEI-9-244656 (patent literature 1) (corresponding to U.S. Pat. No. 5,824,928) and Japanese Patent Publication No. 3044810 (patent literature 2). In the key guide structure disclosed in patent literature 1, a key guide is disposed on an upper portion of a front plate of a frame and inside a distal end portion of a white key, and movement of the white key is guided by cooperation between the key guide and two side surfaces (side walls) of the while key which are opposed to each other in a direction in which a plurality of white keys are arranged (hereinafter "key-arranged direction").

In the key guide structure disclosed in patent literature 2, a key guide is provided vertically on a front portion of a keyboard frame, and a guided section is accommodated within a lower stopper provided on a front end portion of a key. The key is guided by cooperation between the key guide and two side surfaces of the key which are opposed to each other in a key-arranged direction. Patent literature 2 also discloses that a slight amount of grease is put between the key guide and the guided portion.

According to the disclosure of patent literature 1 and patent literature 2, the key guide structure is constructed to guide a key by the key guide contacting, for example, the key's inner side surfaces opposed to each other in the key-arranged direction (i.e., in a width direction of the keyboard). Thus, the disclosed key guide structures would present various problems pertaining to dimensional stability, positional accuracy and appearance of the keys, etc.

Typical example of the size stability problem is as follows. In general, keys are each formed by molding into a downward-opening box-like shape. Thus, due to change (e.g., temporal change) and variation (difference) in resin molding conditions and aftercontraction (or deformation after molding) of the resin molds, the greater the height of the opposed side surfaces of the keys, the more instable would become the dimensions of the opposed side surfaces. Further, regions of the opposed side surfaces farther from the front or rear end surface (i.e., closer to the lengthwise middle) of the keys tend to become instable in dimension (or distance) between the side surfaces. Thus, keys can not be molded accurately into originally-designed dimensions. Thus, unintended contact would occur between the key and the corresponding key guide, with the result that there would arise problems with the key guide function, such as unsmooth vertical movement of the key, noise sound produced due to the unsmooth contact between the key and the key guide, etc.

Typical example of the key position problem is as follows. Each key is positioned in a left-right horizontal direction by the corresponding key guide positioned between the pivot point and distal end of the key. Thus, the closer to the pivot point of the key (i.e., the farther from the distal end) the position of the key guide (key guide section), the more difficult would it become to achieve positional accuracy, in the key-arranged direction, of the key's distal end portion, which would result in great differences in gaps between adjoining keys.

Typical example of the key appearance problem is as follows. In a case where the key guide is located at a position Pa or Pb as shown in FIG. 9, it has been known to provide a rib Ra or Rb near the key guide Pa or Pb to interconnect the opposed side surfaces and thereby prevent deformation (inward warpage) of the side surfaces. However, unwanted sinkage or sink tends to occur in the outer surface of a portion where the rib Ra or Rb is provided. Further, the greater the distance between the side surface of the key (i.e., width of the key), or the greater the height of the rib, the more easily such sink tend to occur. Therefore, the key position problem can be avoided more easily if the position Pa of the key guide section of FIG. 9 is closer to the distal end (front end surface) of the key; in such a case, however, the outer surface of the portion where the deformation-preventing rib Ra is provided may sink more easily than where the key guide section is at the position Pb, and thus, the appearance of the outer surface would be aesthetically impaired. Further, if base portions of the rib are reduced in thickness with a view to avoiding the unwanted sink, it is necessary to provide a slide mechanism (i.e., core sliding toward the rear of the key) in a molding mold, and thus, a space extending toward the rear of the key is required for sliding movement of the slide mechanism.

SUMMARY OF THE INVENTION

In view of the foregoing, it is an object of the present invention to provide a key guide structure in a keyboard apparatus which can maintain design accuracy without being influenced by change and variation of resin molding conditions and aftercontraction of the resin mold. It is another object of the present invention to provide a key guide structure which can prevent vertical movement of a key from becoming unsmooth and prevent production of unwanted noise sound due to inappropriate contact. It is still another object of the present invention to provide a key guide structure which can minimize variation in gaps between adjoining keys by maintaining positional accuracy, in a horizontal key-arranged direction, of the keys and enhance the outer appearance of the keys etc.

In order to accomplish the above-mentioned objects, the present invention provides an improved key guide structure in a keyboard apparatus having a frame and a key pivotably mounted on the frame, which comprises: a key-side guide member provided inside the key and having at least one convexly-formed portion projecting from an inner surface of a distal end portion of the key, remote from a pivot point of the key, toward the pivot point; and a frame-side guide member provided on the frame in such a manner that the frame-side guide member permits movement of the key-side guide member along a pivoting direction of the key but limits lateral movement of the key-side guide member.

Because the key-side guide member has at least one convexly-formed portion projecting from the inner surface of the distal end portion of the key, remote from the pivot point of the key, toward the pivot point and the frame-side guide member is provided so as to permit the movement of the key-side guide member along the pivoting direction of the key but limit the lateral movement of the key-side guide member, the present invention can provide a key guide structure that can maintain the design accuracy without being influenced by change and variation of resin molding conditions and aftercontraction of the resin mold. Further, the present invention can avoid production of unwanted mechanical noise sound.

Further, the present invention can also maintain the positional accuracy, in the key-arranged direction, of the key and thus, it can minimize variation in gaps between adjoining keys and thereby enhance the outer appearance of the keys etc.

As an example, the frame-side guide member has two members defining a guide channel to allow one the convexly-formed portion of the key-side guide member to enter the guide channel, and wherein, by the guide channel, the frame-side guide member not only guides movement, along the pivoting direction of the key, of the key-side guide member but also limits lateral movement of the key-side guide member. With such arrangements, the key-side guide member has to have only one convexly-formed portion, so that molding of the key can be facilitated. Further, the guide channel defined by the two members of the frame-side guide member is open at least at its portion adjacent to the distal end of the key frame (i.e., the two members are spaced from each other in the key-arranged direction at least at their portions adjacent to the distal end of the key frame), to permit entry of the key-side guide member. Thus, in a case where a lubricant agent (such as grease) has to be put between the guide-side guide member and the frame-side guide member, and when the lubricant agent is to be applied to sliding contact portions of the frame-side guide member, it is only necessary to apply the lubricant agent, just once per key, through the open portion of the frame-side guide member; thus, the operation for applying the lubricant agent can be performed with ease even if it is manual. Further, if the lubricant agent application operation is automatized, the operation can be performed in an even more simplified manner and with a minimized number of steps.

As an example, the two members of the frame-side guide member define two side surfaces of the guide channel with no member provided for interconnecting the two members to define a bottom of the guide channel. With this arrangement, the operation for applying the lubricant agent into the guide channel, defined by the two members of the frame-side guide member, can be performed with an increased ease. Thus, this arrangement is more suitable for automatization of the lubricant agent application operation As an example, the frame-side guide member comprises a guide rail formed by means of a single member, and the key-side guide member is disposed so as to sandwich the guide rail by two the convexly-formed portions so that the guide rail not only guides movement, along the pivoting direction of the key, of the key-side guide member but also limits lateral movement of the key-side guide member. Because the frame-side guide member can be constructed of only one member, molding of the key frame can be facilitated.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 3A shows a released position of a key while FIG. 3B shows a depressed position of a key in the embodiment;

DETAILED DESCRIPTION OF THE INVENTION

Figure 1A:
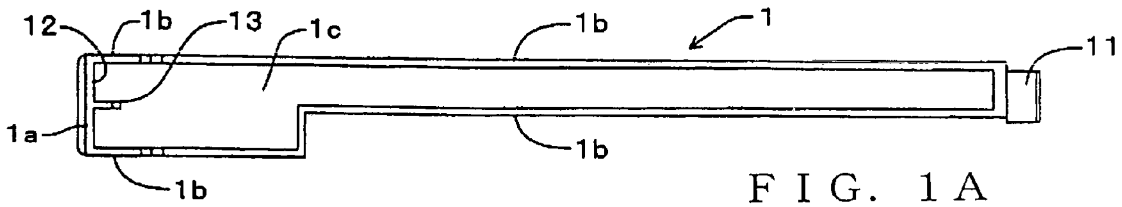
FIG. 1A is a bottom view of a white key in a keyboard apparatus to which is applied a key guide structure in accordance with an embodiment of the present invention.
Figure 1B:
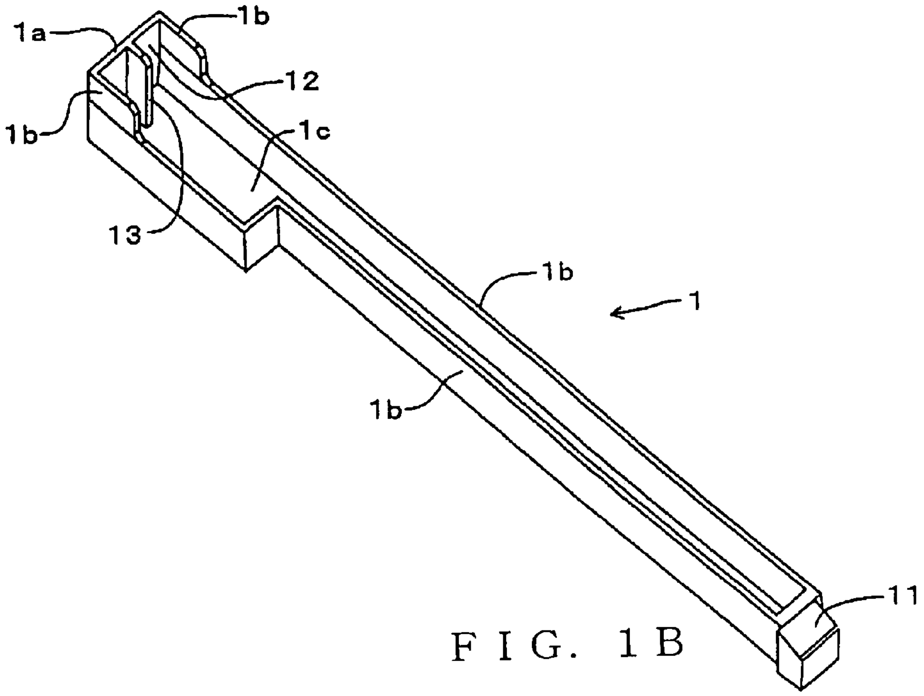
FIG. 1B is a bottom perspective view of the key.
Figure 2:
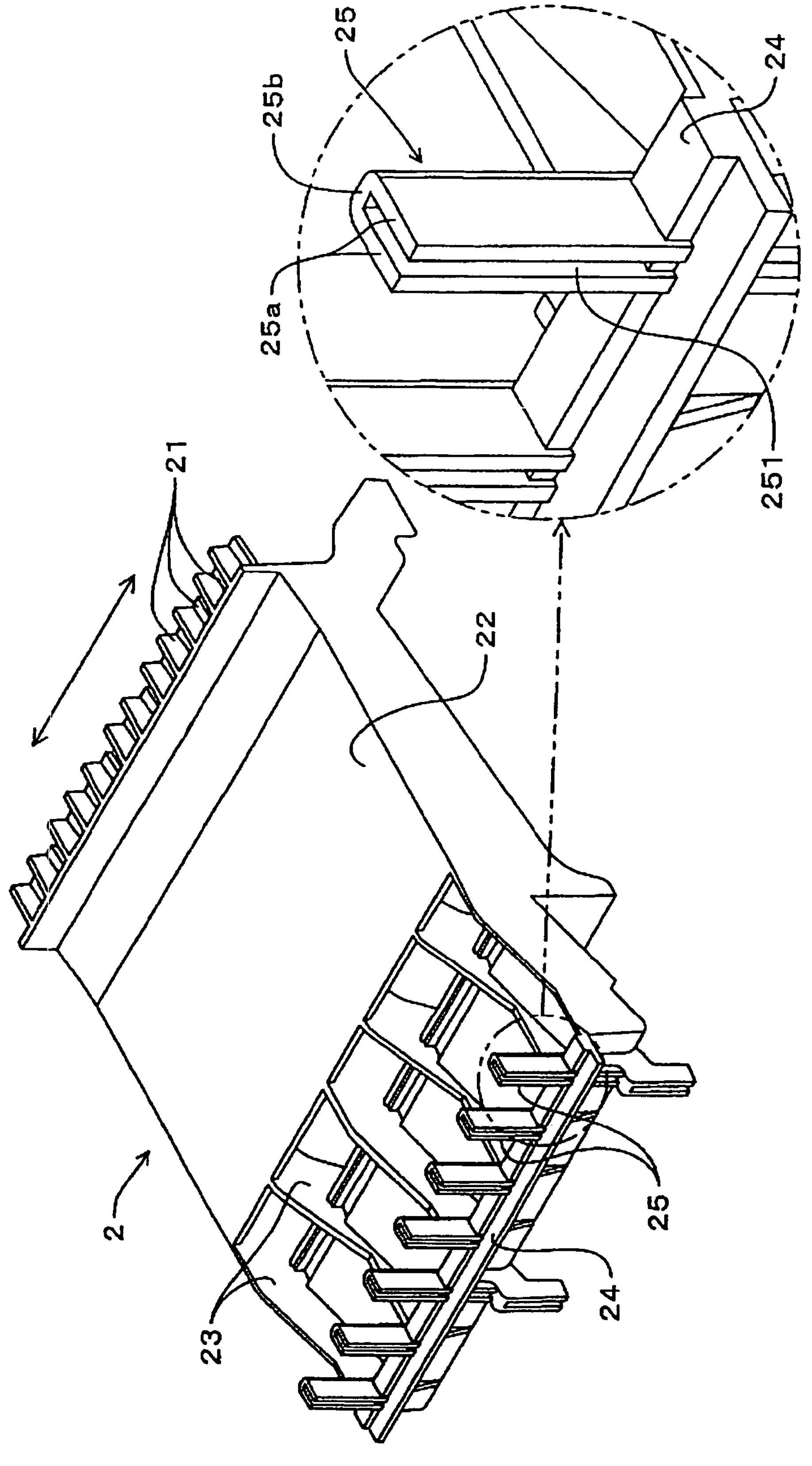
FIG. 2 is a top perspective view showing principal sections of a key frame in the keyboard apparatus.
Figure 3A:
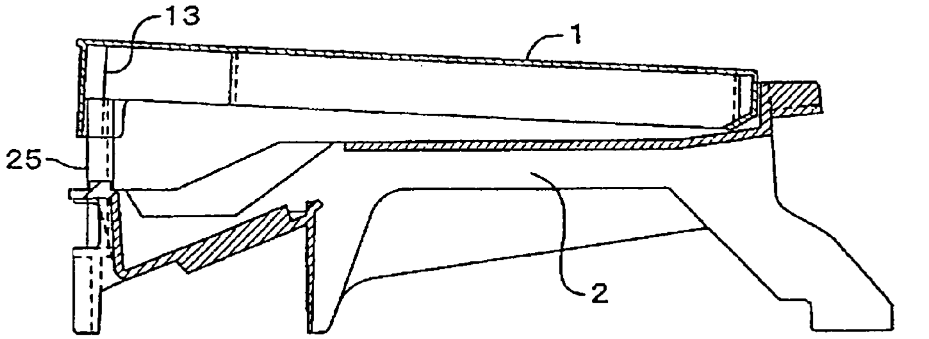
FIGS. 3A and 3B are side sectional views showing principal sections of the keyboard apparatus; more particularly.
Figure 3B:
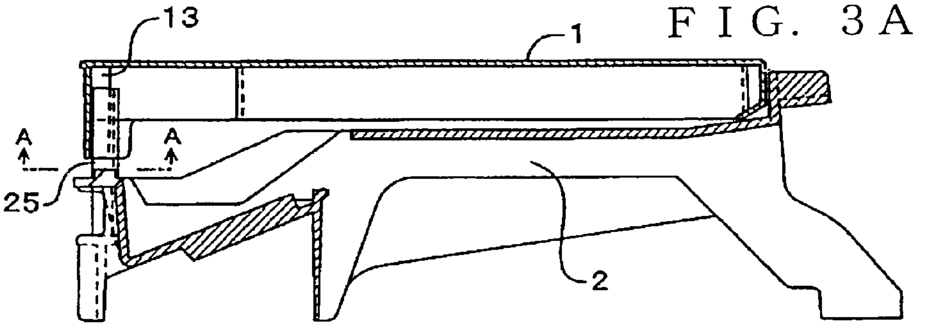

FIG. 1A is a bottom view of a white key in a keyboard apparatus to which is applied a key guide structure in accordance with an embodiment of the present invention, arid FIG. 1B is a bottom perspective view of the key. FIG. 2 is a top perspective view showing principal sections of a key frame in the keyboard apparatus. FIG. 3A is a side sectional view showing a key in a released position, and FIG. 3B is a side sectional view showing a key in a depressed position. In FIGS. 3A and 3B, a left side is where a human player is located at the time of a performance (hereinafter "player side"), and a direction perpendicular to the sheet of FIG. 3 is a direction in which a plurality of keys are arranged. Throughout this specification, "upper", "lower", "left" and "right" represent directions as viewed from the player side, and "front" represents a direction toward the player side while "rear" represents a direction away from the player side, i.e. toward the back of the keyboard apparatus.

The keyboard apparatus is a component of an electronic keyboard instrument, and keys 1 and key frame 2 are each formed by molding synthetic resin. Each of the keys 1 has a proximal end portion 11 at its rear end, and the key frame 2 has a plurality of key support sections 21 on its upper rear end portion. A multiplicity of the keys 1 are provided on the key frame 2 in the horizontal key-arranged direction with their respective proximal end portions 11 mounted to the key support sections 21. The key frame 2 is mounted to a lower casing section of an instrument body casing (not shown). Note that illustration of a circuit board, hammer mechanisms (mass sections), key function blocks for causing the hammer mechanisms to pivot for hammering the corresponding keys, stoppers, etc. is omitted and key support sections (pivot points of the keys) are illustrated in a simplified manner.

Each of the keys 1 has a front wall section la facing the player side, side plate (or wall) sections 1*b* and an upper plate section 1*c* functioning as an operating surface during depression of the key, and the key 1 has a downwardly-opening box-like shape. The front wall section 1*a* has a front inner wall surface portion 12, and a key-side guide member 13, in the form of a rib projecting toward the rear end of the key 1 and extending in a vertical direction of the key 1 from the lower end of the front inner wall surface portion 12 to the upper plate section 1*c*, is formed on a middle region, in the key-arranged direction, of the inner wall surface portion 12.

The key frame 2 has an upper surface portion 22 located forwardly of the key support sections 21. The not-shown circuit board having key switches etc. mounted thereon beneath the keys 1 is disposed on the upper surface portion 22 or on the underside of a front portion of the key frame. The key frame 2 also has a front frame section 24 located forwardly of the upper surface portion 22, and the front frame section 24 is supported by a plurality of ribs 23 and extends in the horizontal key-arranged direction. The front frame section 24 has a plurality of frame-side guide members 25 provided thereon at positions corresponding to the white keys 1 and extending vertically upward from the frame section 24. As shown in enlarged scale in a two-dot-dash circle of FIG. 2, each of the frame-side guide members 25, which has a "U" cross-sectional shape, includes a pair of parallel opposed ridge portions 25*a* and a support portion 25*b* interconnecting the rear ends of the opposed ridge portions 25*a*. Guide channel 251 is formed between the parallel opposed ridge portions 25*a*.

Figure 4:
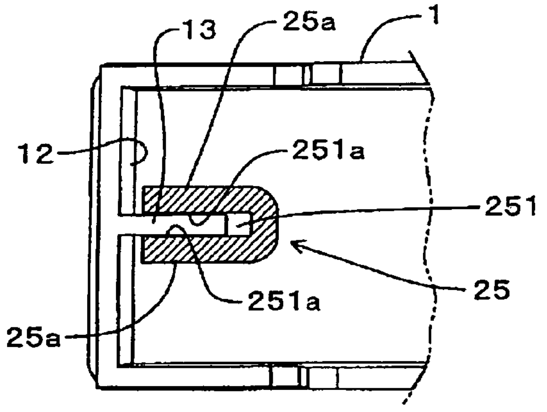
FIG. 4 is an enlarged sectional top plan view, taken along the A-A line of FIG. 3B, showing a key guide section with the key mounted to the key frame.

FIG. 4 is an enlarged sectional top plan view, taken along the A-A line of FIG. 3B, showing a distal end portion of the key 1 mounted to the key frame 2 and the frame-side guide member 25. In this assembled state, the key-side guide member 13 of the key 1 is received in the guide channel 251 of the frame-side guide member 25. Slight gap (clearance) is formed between opposite outer side surfaces 13*a* of the key-side guide member 13 and opposite inner side surfaces 251*a* of the guide member 25.

Figure 5A:
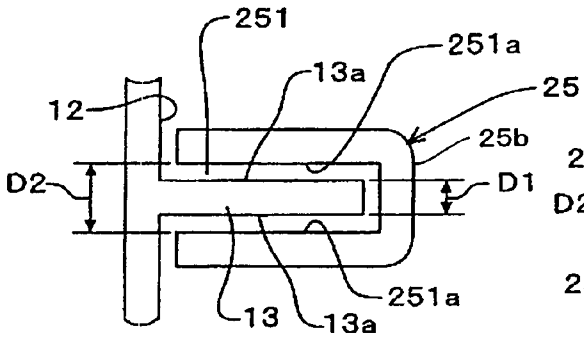
FIGS. 5A and 5B are views explanatory of sizes of a key-side guide member and frame-side guide member in the embodiment.

Namely, as shown in a rather exaggerative manner in FIG. 5A, a distance between the opposite outer side surfaces 13*a* of the key-side guide member 13 is smaller than a distance D2 between the opposite inner side surfaces 251*a* of the guide member 25. The side surfaces 13*a* of the key-side guide member 13 and the inner side surfaces 251*a* of the guide member 25, opposed to each other in the key-arranged direction, each constitute sliding contact portions. Although not specifically shown, a lubricant agent is applied to the sliding contact portions (i.e., between the outer side surfaces 13*a* and the inner side surfaces 251*a*). The support portion 25*b* defining the bottom of the guide channel 251 interconnects and reinforces the opposed ridge portions 25*a* having the inner side surfaces 251*a*.

With the aforementioned arrangements, the key 1 pivots downward as shown in FIG. 3B as the key 1 is depressed from the released position shown in FIG. 3A, during which time the key-side guide member 13 moves downward in the guide channel 251 of the frame-side guide member 25 while being guided by the inner side surfaces 251*a*. Thus, the key 1 can be prevented from shaking in the horizontal key-arranged direction during the downward pivoting movement. The key-side guide member 13 and frame-side guide member 25 together constitute a key guide section that is located at a distal end portion of the key 1 remotest from the proximal end portion 11 (pivot point of the key). Thus, the key guide section can also function to increase the positional accuracy, in the horizontal key-arranged direction, of the key 1. Whereas the key-side guide member 13 is shown and described as being formed to extend upwardly from the lower end of the front inner wall surface portion 12 to the upper plate section 1*c*, the guide member 13 may alternatively be formed to extend vertically upward from the lower end of the front inner wall surface portion 12 to an intermediate region of the inner wall surface portion 12.

FIGS. 6A-6D, FIGS. 7A-7F and 8A-8C show modifications of the key guide section in the present invention. The same elements as in the embodiment of FIGS. 1-4 are indicated here by the same reference characters as in FIGS. 1-4 and will not be described here to avoid unnecessary duplication.

In the first group of modification shown in 6A-6D, the key-side guide member 13 is constructed in the same manner as the key-side guide member 13 employed in the above-described embodiment, but the frame-side guide members 25' is different from the frame-side guide members 25 in the above-described embodiment in that it has reinforcing ribs 25*c*. More specifically, the modification of FIG. 6A has front reinforcing ribs 25*c* that are formed, integrally with the respective front (or distal) ends of the parallel opposed ridge portions 25*a*, to extend laterally outwardly in opposed relation to the front inner wall surface portion 12 of the key 1. The modification of FIG. 6B has, in addition to the front reinforcing ribs 25*c*, rear reinforcing ribs 25*c*' formed, integrally with the opposite ends of the support portion 25*b*, to extend laterally outwardly in the horizontal key-arranged direction. The modification of FIG. 6C has only the rear reinforcing ribs 25*c*' formed integrally with the opposite ends of the support portion 25*b*. The modification of FIG. 6D has a rearward reinforcing rib 25*b* formed by extending straight the support portion 25*b* rearwardly in a longitudinal direction of the key 1.

The frame-side guide member 25 employed in the above-described embodiment of FIGS. 1-4 is sturdy enough because it is formed into a substantial "U" cross-section shape having the parallel opposed ridges 25*a* and the support portion 25*b* interconnecting the rear ends of the ridges 25*a*. The modified frame-side guide members 25 of FIGS. 6A-6D are even more sturdy by virtue of the provision of the reinforcing ribs 25*c*, 25*c*', 25*d*.

In the second group of modification shown in 7A-7F, which have reinforcing ribs similar to those in the first group of modifications of FIGS. 6A-6D, the key-side guide member 13 is constructed in the same manner as the key-side guide member 13 employed in the above-described embodiment, but the frame-side guide members 25' is different from the frame-side guide members 25 in the above-described embodiment in that it does not have the support portion 25*b*. More specifically, in the modification shown in FIG. 7A, the two ridges 25*a* are spaced from each other in the left-right horizontal (or key-arranged direction) direction along their entire length (i.e., without being interconnect at all). Thus, when a lubricant agent is to be applied to the inner side surfaces 251*a* of the guide channel 251, a lubricant-agent-applying member can be inserted through the guide channel 251', defined by the inner side surfaces 251*a*, in the longitudinal direction of the key 1. Thus, when the lubricant applying operation is to be performed manually or even automatically, the operation can be significantly simplified, requiring a reduced number of steps.

Figure 7A:
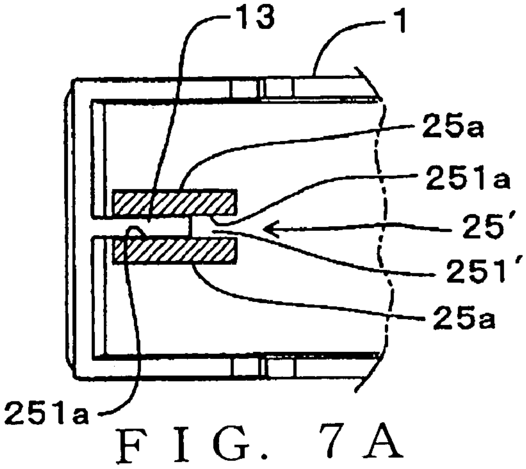
FIGS. 7A-7F are views showing a second group of modifications of the key guide section in the embodiment.
Figure 7B:
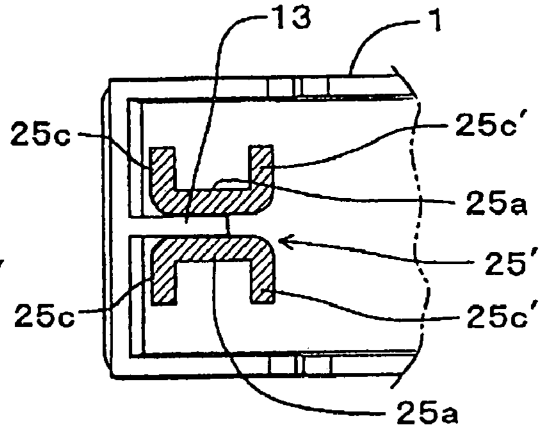
Figure 7C:
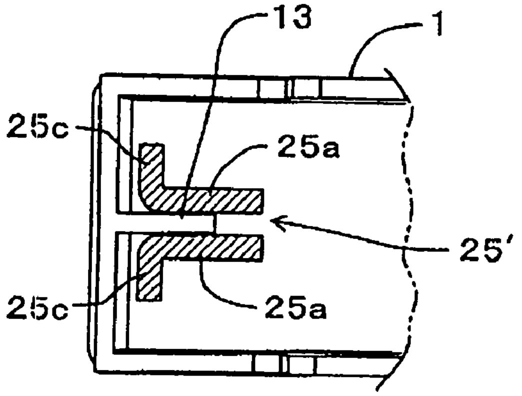
Figure 7D:
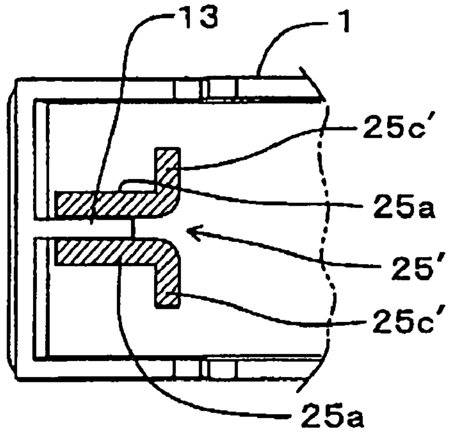
Figure 7E:
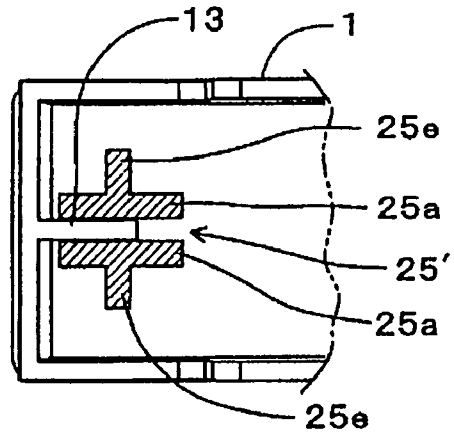
Figure 7F:
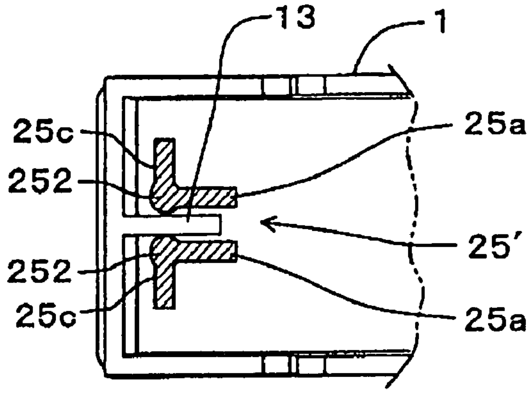

The modifications of FIGS. 7B-7F each have reinforcing ribs similar to those shown in FIGS. 6A-6D. More specifically, the modification of FIG. 7B has front reinforcing ribs 25*c* and rear reinforcing ribs 25*c*' formed integrally with the front and rear ends of the ridges 25*a*. The modification of FIG. 7C has only the front reinforcing ribs 25*c* formed integrally with the front ends of the ridges 25*a*. The modification of FIG. 7D has only the rear reinforcing ribs 25*c*' formed integrally with the rear ends of the ridges 25*a*. The modification of FIG. 7E has reinforcing ribs 25*e* formed integrally with intermediate outer surface regions of the opposed ridges 25*a*. In the modification of FIG. 7F, only the front reinforcing ribs 25*c* are formed integrally with the front ends of the ridges 25*a*, and an increased-thickness portion 252 is formed at each of corners defined by the ridges 25*a* and front reinforcing ribs 25*c*. In the modification of FIG. 7F, such increased-thickness portions 252 contact the outer surfaces of the key-side guide member 13, and thus, the ridges 25*a* function mainly as reinforcing elements.

Figure 8A:
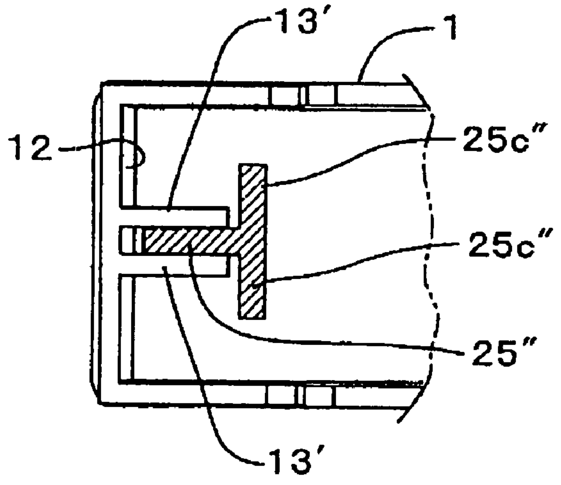
FIGS. 8A-8C are views showing a third group of modifications of the key guide section in the embodiment.
Figure 8B:
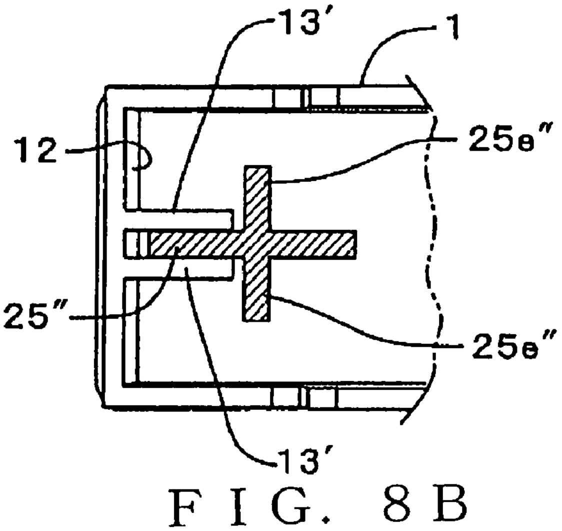
Figure 8C:
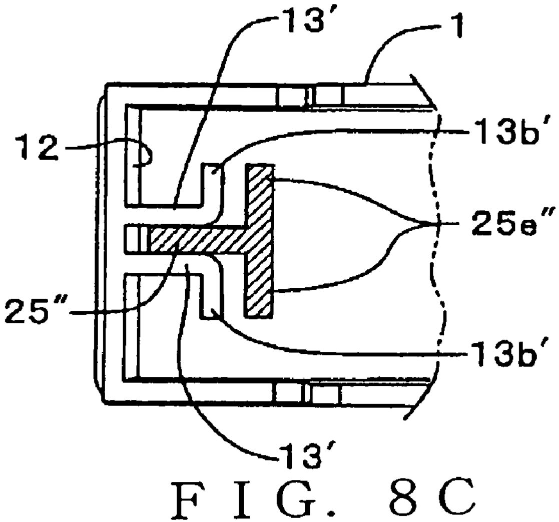
Figure 9:
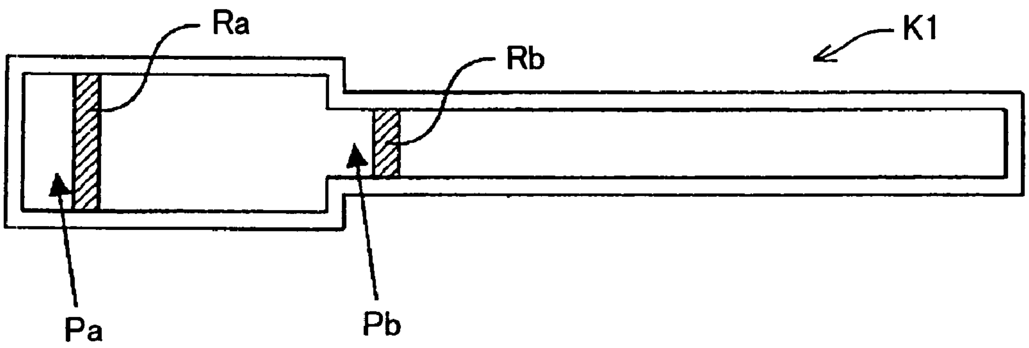
( PRIOR ART ) F I G. 9
FIG. 9 is a view showing example positions where a key guide section is provided in a conventional keyboard apparatus.

In the modifications of FIGS. 8A-8C, two ridges 13' are formed, as key-side guide members, on the front inner wall surface portion 12 and opposed in parallel to each other in the horizontal key-arranged direction. Further, a frame-side guide member 25" is formed as a single ridge (guide rail) and has reinforcing ribs formed thereon. As in the above-described embodiment and modifications (modified embodiments), the frame-side guide member 25" is provided vertically on the front; frame 24 in corresponding relation to the white key 1. The frame-side guide member 25" is interposed between the two ridges 13'; that is, the two ridges 13' are provided so as to sandwich the frame-side guide member 25".

Figure 5B:
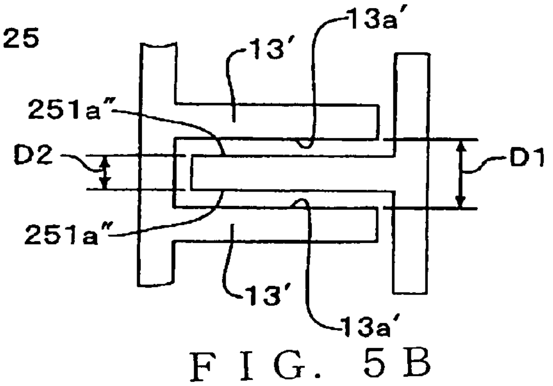
Figure 6A:
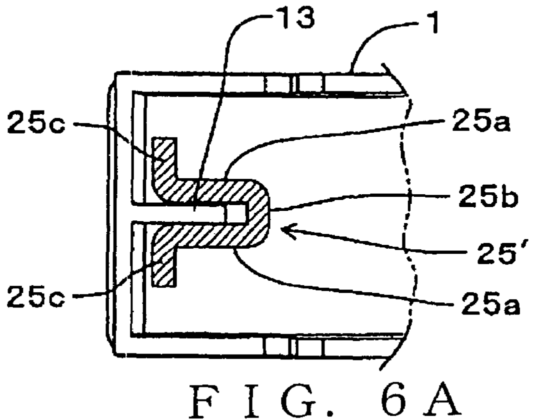
FIGS. 6A-6D are views showing a first group of modifications of the key guide section in the embodiment.
Figure 6B:
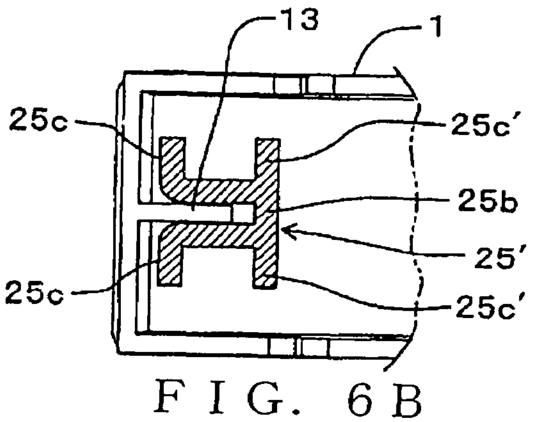
Figure 6C:
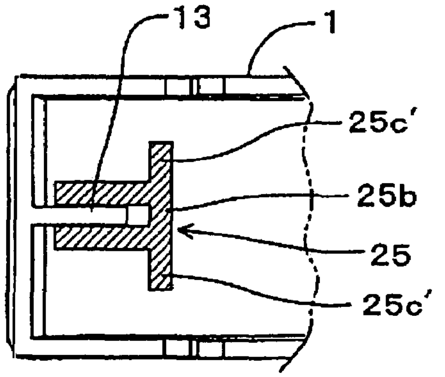
Figure 6D:
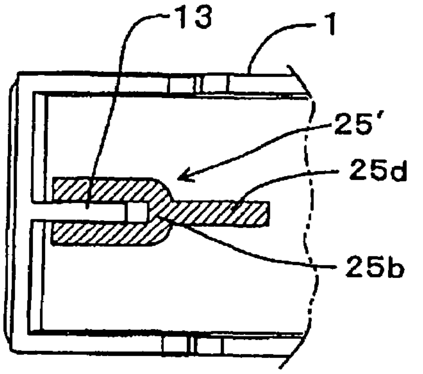

The relationship between the distances D1 and D2 as explained above in relation to FIG. 5A is applied to the first and second groups of modifications too. Namely, in the aforementioned first and second groups of modifications, the distance D1 between the outer side surfaces 13*a* of the key-side guide member 13 is smaller than the distance D2 between the opposed inner side surfaces 251*a* of the guide member 25'. In the aforementioned third group of modifications, on the other hand, the distance D1 between the opposed inner surfaces 13' of the ridges 13' is greater than the distance D2 between the outer side surfaces 251*a*" of the frame-side guide member 25", as seen in FIG. 5B. The inner side surfaces 13*a*' of the ridges 13" and the outer side surfaces 251*a*" of the frame-side guide member 25" opposed to each other, constitute sliding contact portions. In this case too, a lubricant agent is applied to the sliding contact portions (i.e., between the inner side surfaces 13' and the outer side surfaces 251*a*").

In the modification of FIG. 8A, the frame-side guide member 25" has reinforcing ribs 25*c*" formed integrally with the rear end of the guide member 25". In the modification of FIG. 8B, the frame-side guide member 25" has reinforcing ribs 25*e*" formed integrally with intermediate outer surface regions of the guide member 25". Further, in the modification of FIG. 8C, the frame-side guide member 25" has reinforcing ribs 25*e*" formed integrally with the rear end of the guide member 25", and the ridges 13' as the key-side guide members have reinforcing ribs 13*b'*.

In the above-described manner, the present invention can construct a key guide section without impairing the outer appearance of the keys etc. as viewed from above. Further, the present invention can increase a space behind the key guide sections (i.e., space extending toward the read of the keys), and thus, it can enhance degree of freedom concerning installation of components of other functions, such as a drive mechanism of a player piano for automatically performing a key. Furthermore, even in the case where a slide mechanism is provided in a mold, the present invention can increase the space behind the key guide sections and thereby enhance degree of design freedom.

Whereas the various embodiments have been described above in relation to the white keys, the above-described arrangements of the invention can be applied to the black keys as well. In such a case, a frame-side guide member corresponding to a black key only has to be provided between the upper surface portion 22 of the key frame 2 and the front frame section 24 in a horizontal position corresponding to the black key (see, for example, FIG. 3). Because the black key has a smaller width than the white key and a length, from the key support section 21, of the black key is shorter than that of the white key, aftercontraction (deformation after the molding) of the resin mold, opposite side surface deformation (inward warpage), etc. of the black key can be less than those of the white key. Therefore, the present invention need not necessarily be applied to the white key.

Further, in the above-described embodiments, the key-side guide member and frame-side guide member are formed of resin. However, the key-side guide member may be either formed of resin alone or formed by outserting an elastic material, such as elastomer, onto resin. Further, the frame-side guide member may be either formed of resin or metal alone, or formed by covering resin or metal with an elastic material, such as elastomer, through, for example, outserting of the elastic material onto the resin or metal. Furthermore, the key-side guide member and frame-side guide member may each be formed of a combination of the aforementioned materials.

Furthermore, whereas, in the above-described embodiments, the key-side guide member is formed on a middle position, in the horizontal key-arranged direction, of the inner surface of the front (distal end) wall portion of the key, the key-side guide member may be formed on any desired position, in the horizontal key-arranged direction, of the inner surface of the front (distal end) wall portion of the key; namely, the key-side guide member need not formed on the middle position.

What is claimed is:

1. A key guide structure in a keyboard apparatus having a frame and a key pivotably mounted on the frame, said key guide structure comprising:

a key-side guide member provided inside the key and having at least one convexly-formed portion projecting from a front inner wall surface portion of a front wall section of the key, remote from a pivot point of the key, toward the pivot point, the front wall section facing a player side; and a frame-side guide member provided on the frame in such a manner that said frame-side guide member permits movement of said key-side guide member along a pivoting direction of the key but limits lateral movement of said key-side guide member.

2. A key guide structure as claimed in claim 1 wherein said frame-side guide member has two members defining a guide channel to allow one said convexly-formed portion of said key-side guide member to enter the guide channel, and wherein, by the guide channel, said frame-side guide member not only guides movement, along the pivoting direction of the key, of said key-side guide member but also limits lateral movement of said key-side guide member.

3. A key guide structure as claimed in claim 2 wherein the two members of said frame-side guide member defines two side surfaces of the guide channel.

4. A key guide structure as claimed in claim 3 wherein said frame-side guide member further includes a member interconnecting said two members to define a bottom of the guide channel.

5. A key guide structure as claimed in claim 1 wherein said frame-side guide member comprises a guide rail defined by a single member, and said key-side guide member is disposed so as to sandwich the guide rail by two said convexly-formed portions so that the guide rail not only guides movement, along the pivoting direction of the key, of said key-side guide member but also limits lateral movement of said key-side guide member.

6. A key guide structure as claimed in claim 1 wherein said key-side guide member is formed integrally with the key.

7. A key guide structure as claimed in claim 1 wherein said frame-side guide member is formed integrally with the frame.

8. A key guide structure as claimed in claim 1 wherein a plurality of the keys are arranged on the frame.

9. A key guide structure as claimed in claim 8 wherein said keyboard apparatus is a keyboard apparatus of an electronic keyboard instrument, the plurality of the keys include white and black keys, and said key-side guide member and said frame-side guide member are provided in correspondence with the white key.

10. A key guide structure as claimed in claim 1 wherein said key-side guide member and said frame-side guide member slidingly contact each other with a lubricant agent between respective sliding contact portions of said key-side guide member and said frame-side guide member.

* * * * *